Feb. 20, 1934.    J. T. EARLE ET AL    1,948,206
FLOOR TRUCKING EQUIPMENT
Filed Feb. 29, 1932    3 Sheets-Sheet 1
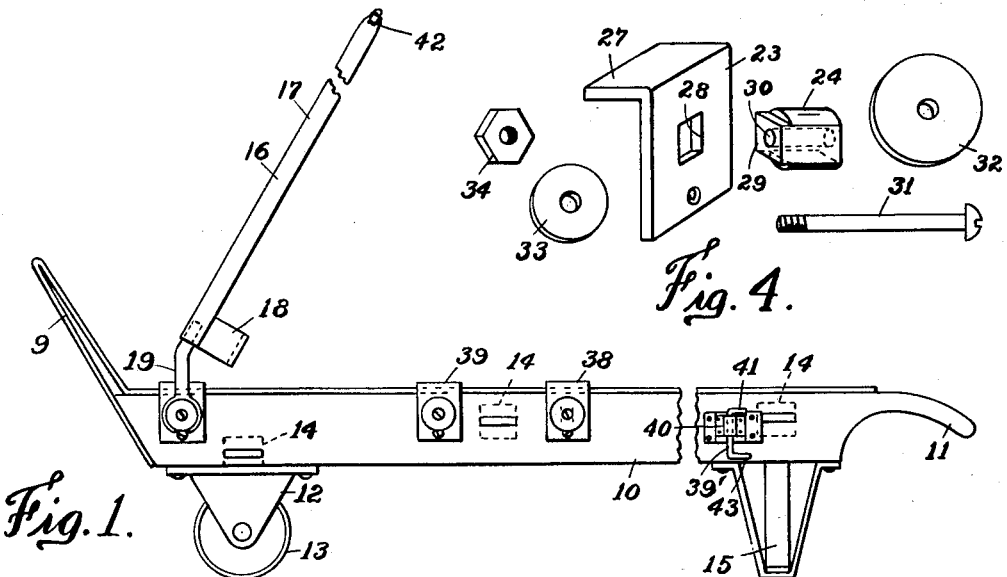
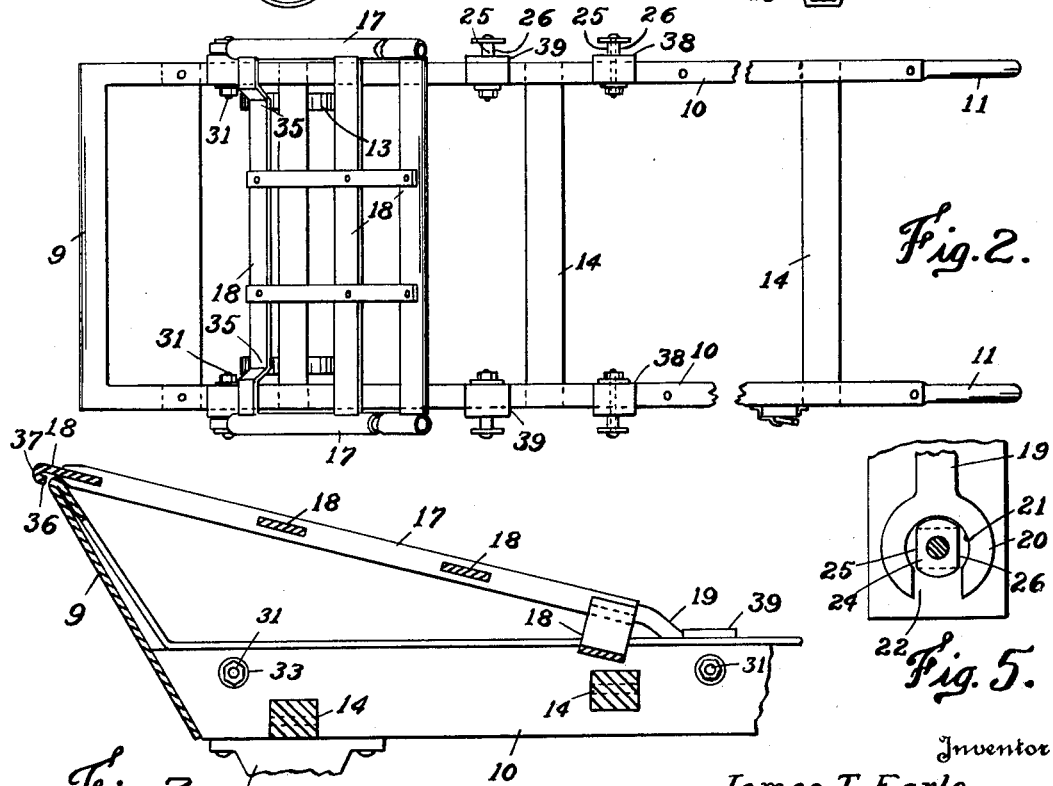
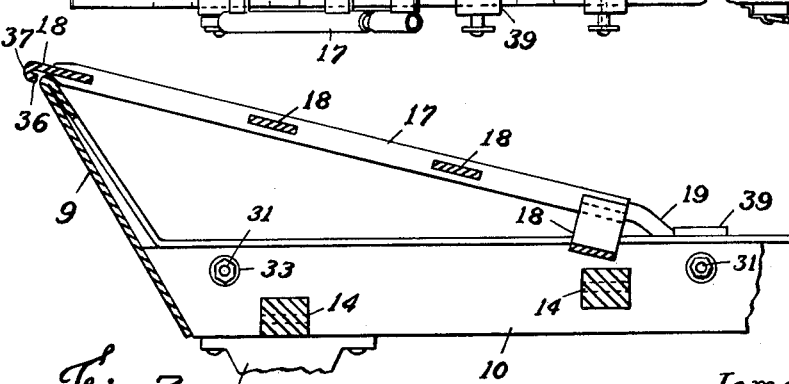
Inventor
James T. Earle
Alvin McNeese

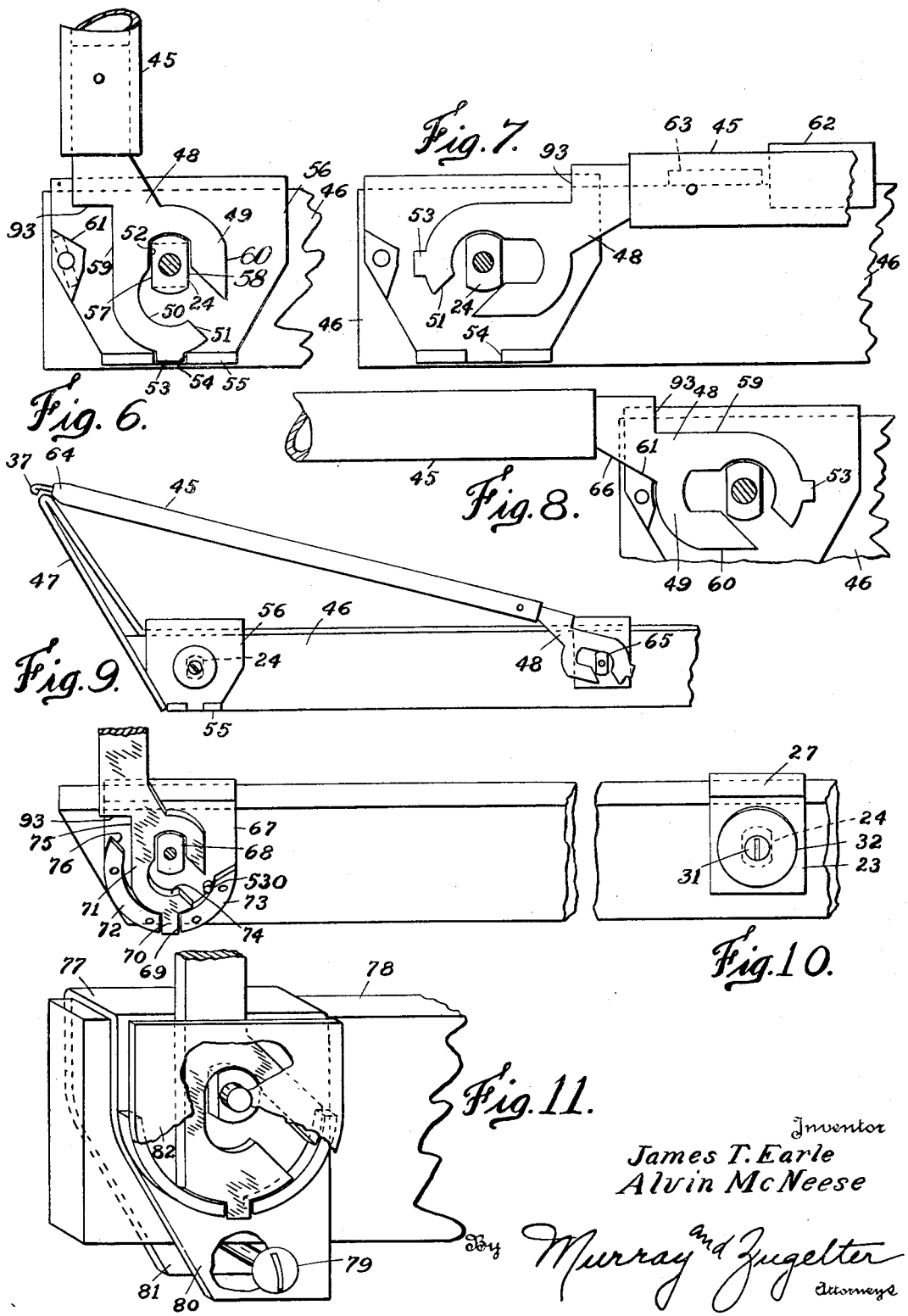

Feb. 20, 1934.    J. T. EARLE ET AL    1,948,206
FLOOR TRUCKING EQUIPMENT
Filed Feb. 29, 1932    3 Sheets-Sheet 3
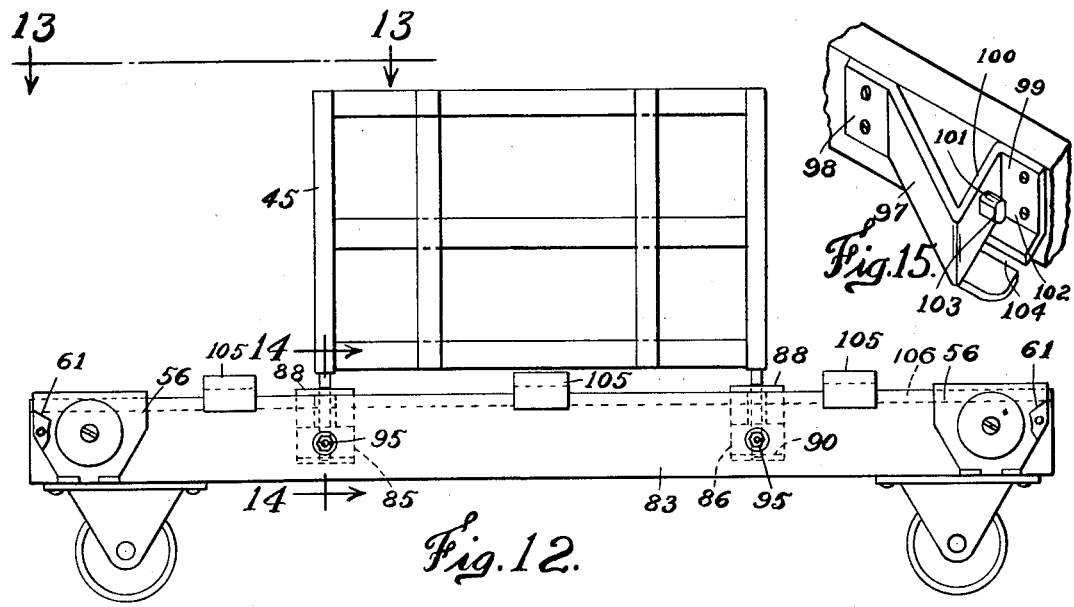
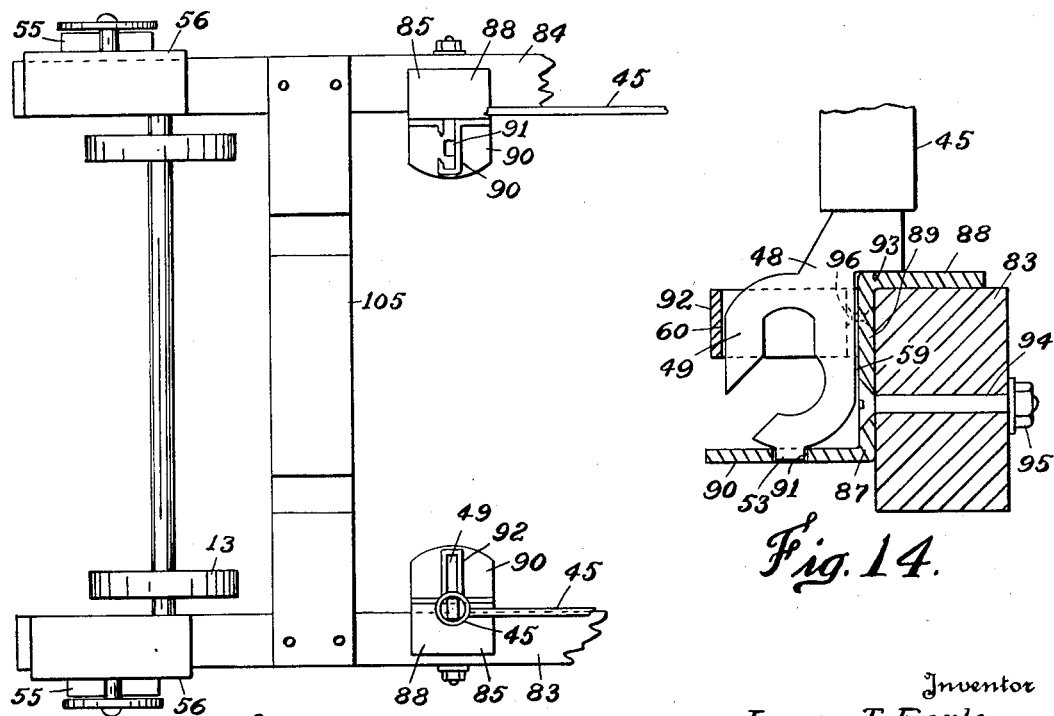
Inventor
James T. Earle
Alvin McNeese
By Murray and Zugelter
Attorneys Patented Feb. 20, 1934

1,948,206

UNITED STATES PATENT OFFICE 1,948,206

FLOOR TRUCKING EQUIPMENT

James T. Earle, Cincinnati, Ohio, and Alvin McNeese, Covington, Ky.

Application February 29, 1932. Serial No. 595,734

8 Claims. (Cl. 280—57)

This invention relates to improvements in trucking devices such as two-wheeled hand trucks, four-wheeled trucks or carriages, or sleds used in the handling of freight, merchandise, or other objects. The device finds application also in moving of hospital patients.

An object of the invention is to provide a truck with an improved rack or frame structure which may be disposed in various operative and inoperative positions with respect to the truck, or removed bodily from the truck, if desired.

Another object is to provide a novel rack or frame mounting for a truck or carriage whereby the rack or frame is precluded from accidental displacement on the truck.

Another object of the invention is to provide a rack or frame structure of the character above stated, which may be applied to a substantially flat carriage or sled, so as to provide substantially vertical upwardly extending removable sides for the carriage or sled.

Another object is to provide a rack for the purpose stated, which may be readily applied to a truck or carriage in various positions for accommodations of various articles of various dimensions.

Another object is to provide a simplified form of detachable rack and mounting therefor, whereby the rack may be used in various capacities.

These and other objects are attained by the means described herein, and disclosed in the accompanying drawings, in which:

Fig. 1 is a side elevational view of a two-wheeled hand truck embodying the invention.

Fig. 2 is a top or plan view of the device of Fig. 1.

Fig. 3 is a longitudinal cross sectional view of the device of Figs. 1 and 2, showing the rack or frame disposed in an operative reversed position upon the extending blade or toe piece of the rack.

Fig. 4 is an exploded view of the bracket which supports the rack.

Fig. 5 is a fragmental elevational view showing the rack so disposed relative to the rack support as to permit removal of the rack therefrom.

Figs. 6, 7, 8, and 9 show, in elevation, a modified form of rack structure applied in various positions upon the side rail of a truck, carriage, or sled, the removable rack of which is adapted for positive connection to the side rail in four useful and desirable operative positions.

Fig. 10 is an isometric view of another modified form of rack structure which is suitable for use on heavy duty two-wheeled or four-wheeled trucks having no extending blade or toe piece.

Fig. 11 is an isometric view, part being broken away, showing another modified form of rack structure which includes a quickly attachable bracket or bearing plate.

Fig. 12 is a side elevational view of a four-wheeled truck, showing the rack structure of Fig. 6 applied thereto in such manner as to provide an upwardly extending side parallel to the longitudinal side rail of the truck.

Fig. 13 is a top plan view taken on line 13—13 of Fig. 12, the floor of the truck being omitted.

Fig. 14 is a cross sectional view taken on line 14—14 of Fig. 12.

Fig. 15 is an isometric view of a modified form of bracket or rack support shown in Figs. 12, 13, and 14.

In the trucking or carriage of freight or merchandise by means of warehouse hand trucks or the like, it is frequently desirable to provide a means other than the usual transverse blade or lifting piece 9 for precluding inadvertent displacement of the goods upon the truck. Various types of racks and auxiliary frames have been devised for holding stacked goods upon such trucks, but these racks were either permanently attached to the trucks or so mounted as to require frequent removal and replacement during the handling of different kinds of merchandise. The present invention concerns a rack which has all the advantages of a permanently attached pivoted rack, and in addition, it may readily be disassociated from the truck and placed thereon in different positions for facilitating the handling of large or bulky objects which overhang the truck. Said rack, although readily detachable for certain purposes, may be retained upon the truck and disposed in a number of desirable and useful positions for the handling of varying classes of merchandise, thereby eliminating frequent detachment of the rack and the subsequent waste of time which heretofore resulted from hunting for the detached rack when it was needed.

The hand truck shown in Figs. 1 and 2 is of ordinary construction, comprising a pair of spaced parallel rail members 10 having handles 11 formed at their rearward ends and having brackets 12 and wheels 13 disposed at their opposite or forward ends. Spacers for the rail members are indicated by 14, and 15 represents legs for the rear portion of the truck. The blade or lifter 9 is of any approved type and usually is inclined forwardly and upwardly at an obtuse angle to the rail members.

A description will first be given of the device of Figs. 1 to 5 inclusive. The rack 16 and the pivotal mounting means therefor are disposed at the forward end of the truck adjacent the blade 9. The rack comprises a pair of parallel side members 17, preferably of hollow metal pipe spaced by means of two or more lateral struts or braces 18. At the lowermost ends of the side members are welded or otherwise fixed the extensions or foot pieces 19, each of which has a free end developed to provide a claw or bifurcated portion 20. The claw is constituted of an enlargement which is provided with a circular opening 21 into which extends a constricted slot or opening 22 of a width less than the diameter of the circular opening. The extensions 19 preferably, though not necessarily, are directed or bent slightly out of the plane of the rack, so as to permit the rack to seat flatly upon the bed of the truck when the rack is disposed in the inoperative position parallel to the truck bed.

Each of the rails 10 has fixed thereto in any suitable manner a bracket 23 to which is secured an extending plug or pivot member 24, which pivot member is provided with flat parallel faces 25 and 26 that preferably are disposed in vertical planes. The distance from face 25 to face 26 is slightly less than the width of the constricted slot 22, and the diameter of the pivot member is slightly less than the diameter of the circular opening 21. By referring to Fig. 5, it should readily be apparent that the member 19 may be removed from engagement with the pivot member 24 only when the flat faces 25 and 26 are parallel to the slot 22. In any other position, the member 19 is locked to the pivot member.

The foregoing should render evident the fact that the rack may be removed from the truck bodily, when in the position illustrated in Fig. 1, and that when said rack is swung into position for contacting blade 9, the rack cannot be removed. Similarly, when the rack is disposed in parallelism with the bed of the truck, it remains connected thereto at its pivotal mounting.

The rack supporting means which includes the pivot member 24, may be of any suitable construction, the preferred form being shown in Fig. 4. In the preferred form, said means comprises the bearing plate 23 having the flange or leg 27 which may abut the top edge of a truck rail. The plate portion 23 preferably abuts the exterior or outer face of the rail. Plate 23 includes means for fixing the pivot member 24 thereto, and said means may consist of a square opening 28 in the plate adapted to receive a square portion 29 on the pivot member 24, for precluding relative rotational movement. The pivot member may include also a longitudinal bore 30 for reception of a screw or bolt 31 that holds the parts 23, 24, 32, 33, and 34 in proper position. The elements 32 and 33 are washers or discs, which are adapted for disposition upon the pivot member 24 and an inner face of a truck rail respectively.

It is to be noted that the strut or transverse cross piece 18 which is adjacent the extensions 19, is bent downwardly or outwardly a few inches from the side rails of the rack, so as to extend between the side rails of a hand truck designed for the handling of barrels, kegs, and the like. The depressed portion of said strut is indicated at 35. It is to be understood that not all hand trucks include a sunken or depressed spacer or cross piece 14 at the forward end, and it is intended that on such trucks the depressed portion 35 would be omitted, thereby causing the strut to be straight like the other struts 18.

This strut 18 as well as the other struts which connect the side members 17 of the rack, may be welded or otherwise fixedly secured to said other side members.

Particular attention is directed to the uppermost strut 18 of the rack, which strut extends beyond the side members 17 and which has a longitudinal edge 36 turned upon itself to provide a rounded edge 37. This turned or otherwise rounded edge is provided on racks to be used with two-wheeled hand trucks, in order to preclude the outer end of the rack from cutting into or otherwise damaging objects placed on the truck when the rack is in the operative reversed position illustrated in Fig. 3.

In order that the rack may be positively connected to the side rails of the truck when placed thereon in the operative reclining position of Fig. 3, the side or rail members 10 of the truck are provided with pairs of rack supports 38 and 39 similar to that indicated in Fig. 4. Like rack support 23, the rack supports 38 and 39 have the flat faces 25 and 26 disposed in vertical planes. It should be evident, therefore, that when disposed in the reclining position of Fig. 3, the rack cannot accidentally be displaced from a pair of rack supports such as 38.

Although the normal use of the hand truck does not require fastening of the rack to the truck bed when the rack is disposed in the flat or inoperative position, it may sometimes be desirable to latch the rack in said position. Accordingly, one of the side members 10 of the truck may carry a latch member 39' supported in a suitable bearing 40, and including a movable bolt 41 adapted to engage a keeper or slot 42 provided in a side member 17 of the rack adjacent to its upper end. The bolt portion 41 may be caused to engage the keeper 42 by actuating the handle 43 for raising the bolt and rotating it so as to effect entry thereof into the keeper or slot 42. In constructions wherein the side members 17 are of angle iron, bar, or rod stock, the keeper might require some slight structural change in order to adapt it for reception of suitable latch means on the truck bed.

From the foregoing it should readily be evident that the rack is connected to the truck bed in both the operative raised and lowered positions, whereas in a given intermediate position it may be removed bodily from the truck bed. In the operative reversed reclining position, in which the rack rests with its upper end upon the blade 9, the opposite end of the rack is positively retained in connected relationship with the truck bed.

The rack structure of Figs. 6 to 9 includes all the advantages of the above described structure, and, in addition, provides among other advantages a quick acting semi-automatic means for maintaining the rack in a substantially perpendicular position with respect to the truck body. The advantage of such a perpendicular disposition of the rack is readily appreciated when it is considered that the hand truck oftentimes is used to handle glass panels and mirrors of large size, as well as certain classes of furniture, or fragile articles which require transportation in an upright position to preclude slippage and breakage. Such articles are sometimes strapped or otherwise secured to the rack of the hand truck, wherefore the advantage of having the rack perpendicular to the truck body should readily be evident.

By means of the structure disclosed in Figs. 6 to 9 inclusive, the rack instantly and without preliminary removal or replacement of any parts, may be caused to assume any of the desired inclinations hereinbefore set forth.

Fig. 6 shows a rack 45 and a side rail 46 of a two or four wheel truck, sled, movable platform or other carriage, the rack 45 being maintained in an operative position substantially at right angles to the rail, by the improved means of this invention. Fig. 7 shows the rack in the inoperative or horizontal position; Fig. 8 shows the rack in a reversed operative position wherein the rack extends outwardly beyond the limits of the truck for increasing the effective length thereof; and Fig. 9 shows said rack applied in a reversed position, to a carriage or truck provided with a blade or lifter 47.

In all of the positions above set forth, the rack is precluded from accidental displacement, by reason of means about to be described.

The side members 45 of the rack (which is substantially similar to rack 16), have fixedly secured to their lower ends the extensions or claw members 48, each of which is composed of a flat enlarged head 49 preferably of a generally elliptical shape. The head is provided with a transverse substantially circular opening, the wall of which is indicated at 50. Two slots or ways 51 and 52 communicate with the opening 50, the slot or way 52 being extended into the material of the head 49 so as to end dead therein. Said slot or way 52 conveniently may be made deep or long enough to receive about half of the pivot member 24, and is extended in the general direction of the length of the rack 45. Exteriorly of the head 49 and extending in a direction substantially opposite to the slot or way 52, is a lug or abutment means 53 which is adapted to enter or cooperate with an opening 54 provided in an outwardly or laterally extending portion 55 of the bracket or rack support 56. The way or slot 51 extends from an exterior edge of the head into the circular opening 50, and is of a width just slightly greater than the distance between the parallel flat faces 57 and 58 of the rack mounting pivot member, but is of less width than the height of said pivot member. Consequently, the head may be disassociated from the pivot member only when the slot 51 and faces 57—58 are in parallel relationship. The slot 51 enters the circular opening at an angle obtuse to the way 52 and extends toward the member 45 although it is at an angle thereto. The exterior side edges 59 and 60 of the head are made flat and in substantial parallelism with the rack members 45, for a purpose to be described later.

From the foregoing, the operation should readily be understoood, it being at once evident that a straight upward pull on the rack results in the pivot member 24 striking the lower portion of wall 50 and therefore precluding removal of the rack vertically; subsequent movement of the rack to the left causes the wall 59 of the head member to abut the lug or abutment 61, which supports the rack in a forwardly inclined position at which the faces 57—58 and slot 51 are not in registration; and upon movement of the rack to the right, (see Fig. 7), to a position flat upon the bed or rail 46 of the truck, the parts 51 and 24 are still in non-registering position, thereby precluding accidental displacement of the rack. The only position at which the head may be disassociated from the pivot member 24 is a position intermediate the vertical and the horizontal, at which intermediate position the parts 51 and 24 will register. The rack then may be removed bodily.

The bearing plate or rack support 56 may be substantially the same as the rack support 23 of Fig. 4, except for the inclusion of the flange 55 and the lug 61.

The reference character 62 of Fig. 7 indicates one of a series of transverse strips of wood or other suitable material, which are fixedly supported upon the body of a four-wheeled truck or other flat carrier, and which are spaced from one another to permit the transverse struts or cross pieces 63 of the rack to lie therebetween. Said strips 63 are sufficiently high, or thick, to preclude large flat sheets of merchandise from contacting the rack when it is lying parallel to the truck body. Thus, large sheets of metal and the like may rest upon a frictional surface, such as the wood strips 62, instead of upon the metal of the rack, and be transported without danger of shifting and falling from the truck.

That the rack 45 may be reversed and placed upon an ordinary hand truck as in Fig. 3, is clearly shown in Fig. 9. As illustrated in Fig. 9, the rack may rest with its forward end 64 atop the blade 47, while its other end or claw 48 engages an auxiliary pivot means 65 similar to that of Fig. 4. It is to be observed that in the position indicated in Fig. 9, the rack cannot accidentally be displaced from the pivot means 65 because the opposed flat faces thereof are not in registry with the open slot of the claw.

It is sometimes desirable to increase the length of a flat truck or the like by extending a rack such as 45 horizontally beyond the end of the truck (see Fig. 8). By simply removing the rack of Fig. 6 and replacing it in a reversed position, the condition depicted in Fig. 8 is secured. It will be observed that the edge 59 under the foregoing conditions does not abut the lug 61, but instead, the lug is contacted by a third abutment edge 66 of the claw, which edge is adjacent to the edge 60 but disposed at an acute angle thereto and to the edge 59. Said abutment 66 is disposed substantially opposite the lug 53.

With regard to Fig. 6, it is apparent that the lug 53 could be on the flange 55 and the opening 54 could be formed in the bottom edge of the member 48. The elements 53 and 54 constitute cooperative means on the bracket and rack for maintaining the rack in a substantially vertical position.

The modification shown in Fig. 10 differs from the form of device shown in Fig. 6 in that the bracket 67, which supports the mounting pivot 68, carries a semicircular track member which is broken at 69 to provide an opening for reception of the lug 70 of the head 71. The track sections 72 and 73 may be riveted, welded or otherwise secured to the bracket. It is to be noted that the lug or retaining means 70 is sufficiently long to ride upon the interior track provided by members 72—73 when the member 68 is disposed wholly within the circular opening 74. This construction provides a smoothly operating device of great durability. The surface 75 abuts stop 76 when the rack is moved to the forwardly inclined position. At 530 is shown an auxiliary extending stop against which the lug 70 may abut when the rack is forwardly inclined.

The device of Fig. 11 is a quickly attachable unit very similar to that of Fig. 10, showing an inverted U-shaped form of bracket, indicated at 77, which readily may be slipped over a truck rail 78 and clamped thereto by means of a bolt 79 which passes through the perforated sides 80 and 81 and underneath the truck rail. This modified form of device includes a cover 82 for the working parts, and is attachable to existing forms of trucks.

Attention is now invited to Figs. 12, 13, and 14 showing a flat or horizontal form of carriage which may or may not be provided with wheels, and which includes a novel arrangement of means whereby removable racks may be disposed at the ends of the body in various inclined positions, or at the sides thereof. Pairs of rack supports or brackets 56 (see Fig. 6), are mounted upon the carriage rails 83 and 84 near the ends of the carriage, and these brackets support the racks 45 in the vertical, inclined, and the two horizontal positions previously referred to during the description of Figs. 6, 7 and 8. Each of the carriage side rails carries a pair of fixed holders or brackets 85 and 86 which are properly spaced apart so as to support the racks in an upright or vertical position lengthwise of the carriage (Fig. 12). Each holder comprises a Z-shaped angular body portion 87, the legs 88 and 89 of which abut the top and side, respectively, of a truck or carriage rail such as 83. The third extending leg 90 of the bracket body is substantially at right angles to the leg 89 and is provided with an opening 91 for reception of the lug 53 of the rack extension 48. Directly above the opening and extending outwardly from the portion 89 is a band-like element 92 which receives and stabilizes the head 49 of the extension. The band is of such size that it snugly abuts the straight side edge 60 of the head 49 whilst the other straight side edge 59 abuts the body portion 89 of the holder. Thus the racks are held in an upright position.

In order to preclude unnecessary strain on the holder portion 90, the top leg 88 is made to support the weight of the rack by the provision of an offset abutment 93 on the head 48. The offset abutment is at right angles to the plane of the rack, and by resting upon the well supported leg 88 of the holder it carries the entire weight of the rack without straining or distorting any of the parts. The holder or bracket may be secured to the carriage by any suitable means such as by a bolt 94 passing through the leg 87 and the rail 83, and held in position by a nut 95. Should the rails of the truck be of metal, the holders and also the devices 56 may be welded, riveted, or bolted thereto. The bands 92 may be suitably secured to the holder body by means of rivets or the like 96, or by welding. Whether the holders extend inwardly or outwardly of the truck rails 83 and 84 is immaterial.

The modified form of holder shown in Fig. 15 comprises a body including an angularly disposed bumper or deflector portion 97 formed integrally with the perforated flanges 98 and 99. On the laterally outwardly extending plate portion 100 is fixed a mounting pivot 101 identical with that indicated at 24 in Fig. 6, said pivot having its opposed parallel flat faces 102 and 103 disposed in a vertical plane. The slot 104 corresponds to the opening 91 of holder 87 and performs the same function. With the holder of Fig. 15 applied to a truck rail, the fixed mounting pivot 101 performs, as in Fig. 6, to preclude accidental upward lifting of the rack from the holder. This type of holder is adapted to be secured to the side of a wooden or metal frame member of a four wheeled warehouse truck.

From the foregoing it will readily be understood that the racks of Fig. 12 straddle the frame of the truck or other carriage device, and are so arranged as to be disposed either in the inclined and vertical positions or laid flat on top of the truck body. When it is necessary to handle articles longer than the truck, such as pipe, timbers, rolls of carpets, rugs and the like, the rack may instantly be removed from the ends of the truck and placed at the sides thereof without removal of screws, bolts or other securing means. When necessary to handle articles such as sheet iron, plaster board, doors and the like, which are wider than the truck, the rack may be folded down so as to dispose the side members of the rack along the side rails of the truck, with the cross pieces or struts of the rack disposed upon the floor 106 of the truck between the spaced transverse strips or slats 105 which are secured to the truck body. The slats are of such thickness or height as to extend above all parts of the rack when the rack is lying flat upon the floor of the truck body, so that sheet material such as metal panels and the like may rest upon the transverse wooden slats rather than upon the metal racks. By resting upon the slats rather than upon the metal racks, said sheets would be less likely to shift their position during hauling.

It is to be understood that various modifications and changes in structural details of the device may be made, within the scope of the appended claims, without departing from the spirit of the invention.

What is claimed is:

1. A trucking device body having in combination a rack comprising side members and transverse connecting bars, the side members being pivoted upon the body to provide for movement of the rack to inclined positions and to an inoperative horizontal position flat upon the body of the trucking device, and upwardly extending strips secured to the body at locations wherein they extend between the connecting bars of the rack when the rack is flat upon the body, the strips being of such thickness as to extend above all parts of the horizontally disposed rack.

2. A detachable rack for trucking devices said rack comprising side members secured together in spaced relationship, and extensions on each side member projecting therefrom in a common direction said extensions each comprising a head having a substantially central opening with a communicating slot extending from the opening to an edge of the head, and an offset abutment on the head exteriorly of the opening said offset abutment being substantially at right angles to the plane of the rack.

3. A detachable rack for trucking devices said rack comprising side members secured together in spaced relationship, and extensions on each side member projecting therefrom in a common direction said extensions each comprising an elongated substantially flat head having a substantially central opening with a communicating slot extending from the opening to an edge of the head, an offset abutment on the head exteriorly of the opening and disposed substantially at right angles to the plane of the rack, and a pair of substantially parallel straight edges on the head extending in the general direction of the major axis of the head.

4. A detachable rack for trucking devices said rack comprising side members secured together in spaced relationship, and extensions on each side member projecting therefrom in a common direction said extensions each comprising an elongated substantially flat head having a substantially central opening with a communicating slot extending from the opening to an edge of the head, an offset abutment on the head exteriorly of the opening and disposed substantially at right angles to the plane of the rack, and a pair of substantially parallel straight edges on the head extending in the general direction of the major axis of the head and a stabilizing latch element at the free end of the head.

5. A detachable rack for trucking devices said rack comprising side members secured together in spaced relationship, and extensions on each side member projecting therefrom in a common direction said extensions each comprising an elongated head having a substantially central circular opening with a way and a slot communicating therewith, the slot being of lesser width than the diameter of the circular opening and extended from said opening to an edge of the head, the way being extended from the opening in the general direction of the major axis of the head.

6. A detachable rack for trucking devices said rack comprising side members secured together in spaced relationship, and extensions on each side member projecting therefrom in a common direction said extensions each comprising an elongated head having a substantially central circular opening with a way and a slot communicating therewith, the slot being of lesser width than the diameter of the circular opening and extended from said opening to an edge of the head, the way being extended from the opening in the general direction of the major axis of the head, and at an obtuse angle to the communicating slot.

7. A detachable rack for trucking devices said rack comprising side members secured together in spaced relationship, and extensions on each side member projecting therefrom in a common direction said extensions each comprising an elongated head having a substantially central circular opening with a way and a slot communicating therewith, the slot being of less width than the diameter of the circular opening and extended from said opening to an edge of the head, the way being extended from the opening in the general direction of the major axis of the head and at an obtuse angle to the communicating slot, and a stabilizing latch element at the free end of the head exteriorly of the circular opening.

8. A detachable rack for trucking devices said rack comprising side members secured together in spaced relationship, and extensions on each side member projecting therefrom in the general direction of the rack, said extensions each comprising a head having a substantially central circular opening with a way and a slot communicating therewith, the slot being of lesser width than the diameter of the circular opening and extended outwardly from said opening to an edge of the head, the way being extended from the opening in a generally opposite direction to that in which the slot extends.

JAMES T. EARLE.
ALVIN McNEESE.